United States Patent [19]

Williams

[11] 4,268,885
[45] May 19, 1981

[54] GFI SENSOR CIRCUIT

[75] Inventor: Malcolm Williams, Orinda, Calif.

[73] Assignee: Slater Electric Inc., Glen Cove, N.Y.

[21] Appl. No.: 62,956

[22] Filed: Aug. 2, 1979

[51] Int. Cl.³ .............................................. H02H 3/28
[52] U.S. Cl. ..................................................... 361/45
[58] Field of Search ............................... 361/42, 45–50

[56] References Cited

U.S. PATENT DOCUMENTS

| | | | |
|---|---|---|---|
| 3,878,435 | 4/1975 | Van Zeeland et al. | 361/45 |
| 3,936,699 | 2/1976 | Adams | 361/45 |
| 4,024,436 | 5/1977 | Adams | 361/45 |

Primary Examiner—Harry E. Moose, Jr.
Attorney, Agent, or Firm—Hopgood, Calimafde, Kalil, Blaustein & Lieberman

[57] ABSTRACT

In an electronic module for a ground fault interrupter the portion that amplifies a sensed ground fault signal is in the form of a series of cascaded CMOS inverter stages. The electronic module also includes an additional CMOS inverter providing a balanced input to the amplifier to aid in preventing operation of the ground fault interrupter during the turn-on period of operation.

8 Claims, 1 Drawing Figure

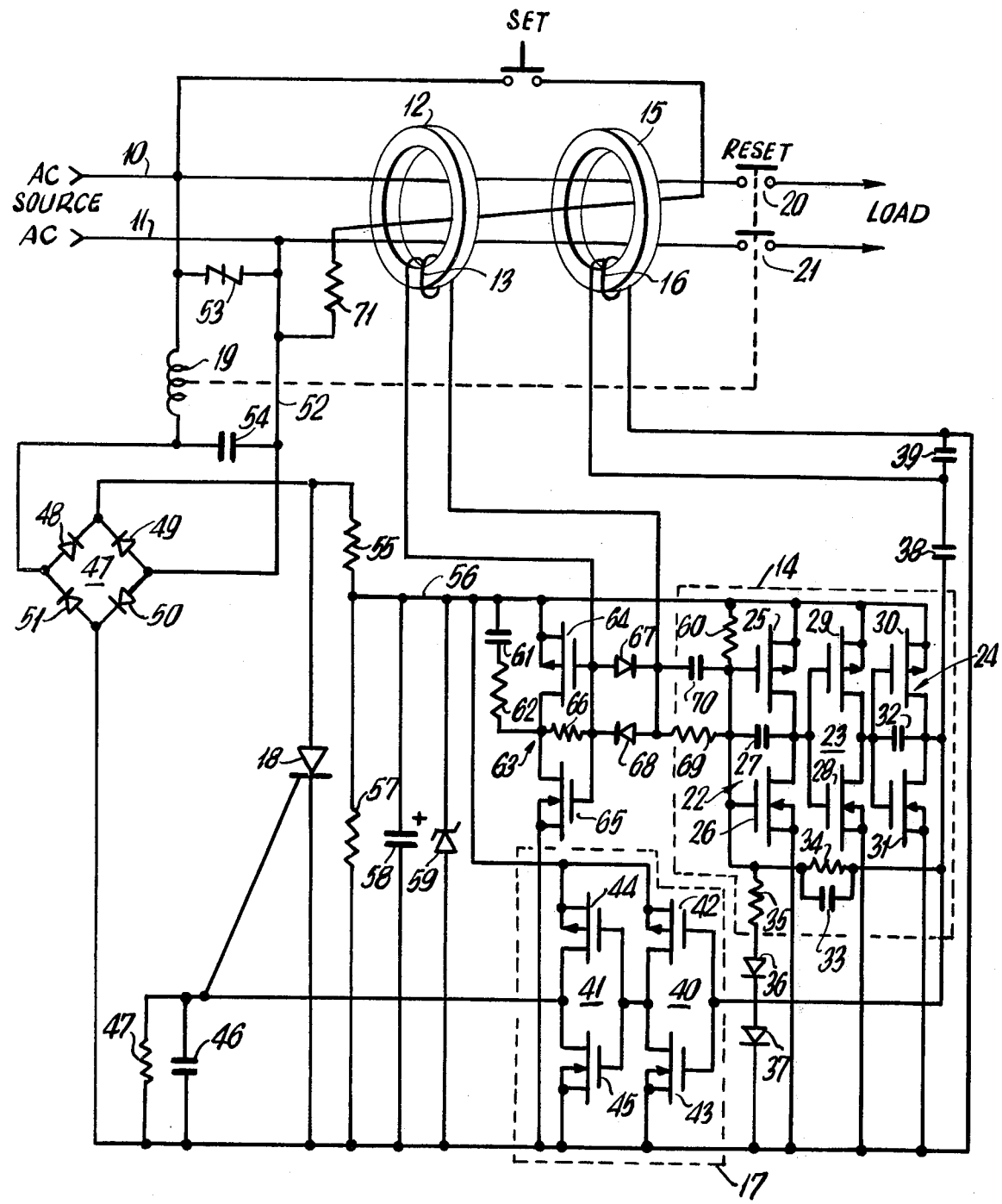

GFI SENSOR CIRCUIT

The present invention relates generally to ground fault interrupters, and more particularly to an improved electronic module for use in a ground fault interrupter.

Ground fault interrupters have by now become a common component of residential and commercial electrical systems for the purpose of preventing shock to a user of an electrical appliance or machine in the event of a ground fault.

In the operation of a conventional ground fault interrupter, such as that disclosed in the Patent to Adams No. 3,936,699, a ground fault is detected as an imbalance in the currents flowing through a sensing differential transformer, which develops a low-level ground fault signal. That signal is amplified and the amplified ground fault signal actuates a switching device, typically a silicon controlled rectifier (SCR) to, in turn, operate a solenoid. The latter operation causes contacts connected in series with the power conductor to open. Moreover, when a grounded neutral condition occurs, which may desensitize ground fault detection, the normally stable amplifier is caused to oscillate to produce a signal that is applied to the control terminal of the SCR to render the latter conductive, thereby interrupting the power conductors.

The amplifier of a ground fault interrupter circuit is commonly fabricated as a monolithic integrated circuit. However, the complexity of the amplifier used in the conventional ground fault interrupter circuit, which typically requires upwards to thirty separate components, has necessitated the use of a relatively large silicon chip for fabricating the integrated amplifier circuit. This need for a large area of silicon material, in turn, has caused the electronic portion of the ground fault interrupter to be relatively expensive, and this expense has had the effect of limiting the demand for ground fault interrupters, even though these devices have the ability to prevent what could be a lethal electrical shock to an individual.

It is thus an object of the present invention to provide a ground fault interrupter circuit that requires fewer components and which can thus be less expensively fabricated as an integrated circuit.

It is a general object of the present invention to provide a ground fault interrupter circuit of reduced complexity and cost and increased reliability.

To these ends, the ground fault circuit of the invention includes a differential transformer for detecting the occurrence of a ground fault in an a.c. power distribution line and for producing, upon this occurrence, a low-level ground fault signal. That signal is amplified in an amplifier, which comprises a plurality of cascaded CMOS inverter stages. The thus amplified ground fault signal is applied to the control terminal of a switching element which, when actuated, operates a relay to interrupt the distribution line, and thereby remove possible danger to an individual from the ground fault.

To the accomplishment of the above and of such further objects as may hereinafter appear, the present invention relates to a ground fault interrupter circuit substantially as defined in the appended claims and as described in the following detailed specification and as illustrated in the accompanying drawing in which the single FIGURE is a schematic diagram of a ground fault circuit in accordance with the present invention.

The ground fault circuit of the invention is herein described for use in detecting a ground fault condition in a two-wire a.c. power distribution system, which includes a pair of conductors 10 and 11, connected to an A.C. source (not shown) and to a load (also not shown in the drawing).

The conductors 10, 11, which pass through the opening of a toroid core 12, form the primary winding of a differential transformer. The secondary windings 13 of that transformer are connected to the input of an amplifier 14, which is described in greater detail below. The conductors 10, 11 also pass through a second toroid 15 and form the primary winding of a neutral fault monitor transformer. The secondary windings 16 of the neutral fault monitor transformer are coupled to the output of amplifier 14.

The output of the amplifier 14 is also coupled through a threshold detector generally designated 17 to the control terminal of a switching element, here shown as an SCR 18, which, when actuated upon the occurrence of a ground fault, causes energizing current to flow through a trip coil 19. Trip coil 19 when actuated in this manner opens a pair of contacts 20, 21, connnected in series with conductors 10, 11, thereby to interrupt the conductors and prevent a possible lethal shock to an individual that could occur upon the occurrence of a ground fault.

In accordance with the present invention, the amplifier 14, in contrast to the monolithic integrated operational amplifiers typically employed in conventional ground fault interrupter circuits, is comprised of a plurality of series-connected CMOS inverter stages 22, 23, and 24. Inverter stage 22 comprises a p-channel enhancement MOSFET 25 having a drain connected to that of an n-channel MOSFET 26. The gates of FETs 25 and 26 are connected to one another, and a capacitor 27 is connected between the drains and gates of these FETs to provide high-frequency compensation.

Similarly, CMOS inverter stage 23 includes a p-channel enhancement type MOSFET 28 having a drain connected to the drain of an n-channel enhancement type MOSFET 29. The gates of MOSFETs 28 and 29 are connected in common and to the drains of FETs 25, 26. The inverter stage 24 comprises a p-channel enhancement-type MOSFET 30 having a drain connected to that of an n-channel enhancement-type MOSFET 31. The drains of MOSFETs 30 and 31 are connected in common as the output of amplifier 14, and the gates of these FETs are also connected in common and to the connected drains of FETs 28 and 29. A frequency-compensating capacitor 32 is connected between the gates and drains of FETs 30 and 31.

Amplifier 14 also includes a feedback resistor 34 connected between its output and input and a high-frequency compensation capacitor 33 connected in parallel with resistor 34. Temperature compensation for amplifier 14 is provided by a resistor 35 connected in series with temperature-compensating diodes 36 and 37 to ground.

The output of amplifier 14 is coupled to the primary windings 16 of transformer 15 through a band-pass capacitor 38, and a tuning capacitor 39 is connected across windings 16 to form a tuned circuit therewith.

The threshold detector 17 comprises a pair of CMOS inverter stages 40 and 41. Stage 40 comprises a p-channel enhancement type MOSFET 42 having a drain connected to that of an n-channel enhancement type MOSFET 43 and a gate connected to the gate of FET 43 and to the output of amplifier 14.

The drains of FETs 42, 43 are connected to the common connection of the gates of a p-channel enhancement-type MOSFET 44 and an n-channel enhancement type MOSFET 45, whose drains are connected in common and to the gate of SCR 18. Connected between the gate of SCR 18 and ground is the parallel connection of a noise-suppression capacitor 46 and a discharge resistor 47.

Operating power for the amplifier and for the other active portions of the circuit is derived from a power supply, which includes a diode rectifier bridge 47 comprising diodes 48, 49, 50 and 51. Input current to the rectifier bridge is derived from conductor 10, and return is provided to conductor 11 through a line 52. A metal-oxide varistor (MOV) 53 is connected between the line 52 and the line in series with trip coil 19 to protect the circuit from overvoltages or high-level transients on the power line, and a noise and transient suppression capacitor 54 is connected between line 52 and the other side of trip coil 19.

Rectifier bridge 47 is connected through a power dropping resistor 55 to a line 56, which is connected to the sources of FETs 25, 28, 30, 42, 44, and 64. Connected between lines 56 and ground are an off-discharge resistor 57, a filter capacitor 58, and a shunt regulating Zener diode 59. A biasing resistor 60 for the amplifier 14 is connected between line 56 and the gates of MOSFETs 25, 26. Resistor 60 along with feedback resistor 34 serve to bias the FETs of amplifier 14 to operate in a transitional phase so that each of the CMOS inverter stages 22, 23, and 24 provides an open-loop gain of about 40.

Line 56 is also connected through a charge transfer capacitor 61 and a resistor 62 to an additional CMOS inverter stage 63, which is coupled to the input of amplifier 14. Stage 63 provides a balanced stage to the input of amplifier 14 to aid in preventing the actuation of the interrupter by a noise or transient signal which may appear during power turn-on as described below. Inverter stage 63 comprises a p-channel enhancement-type MOSFET 64 having its drain and gate respectively connected to the drain and gate of an n-channel enhancement-type MOSFET 65. A feedback resistor 66 is connected between the gates and drains of FETs 64 and 65.

The inverter stage 63 is coupled to the input of amplifier 14 through a pair of oppositely-poled clamping diodes 67, 68, which are also connected across winding 13. The diodes 67, 68 in turn are coupled to the gates of FETs 25, 26 of amplifier 14 through the parallel combination of a discharge resistor 69 and a coupling capacitor 70. A test fault resistor 71 is connected between line 52 and conductor 10 through a test fault switch 72 for use in testing the operation of the ground fault interrupter by creating a current imbalance through transformer 12, thereby to simulate a ground fault condition.

In operation, upon the occurrence of a ground fault the currents flowing in the conductors 10, 11, which are normally equal, will become unequal by an amount corresponding to the ground fault current. That current imbalance in the primary windings of transformer 12 induces a low level ground fault signal in the secondary winding 13 of that transformer.

That ground fault signal is coupled through capacitor 70 to the input of the amplifier 14, where it is amplified and applied to the input of threshold detector 17. Whenever the level of the input signal applied to threshold detector 17 reaches a predetermined level, e.g. 2 volts, the output of the detector 17 shifts from a low to a high level, thereby turning on the SCR 18 and energizing the trip coil 19 to open the contacts 20, 21.

Upon the occurrence of a grounded neutral condition, for reasons similar to that described in the aforesaid U.S. Pat. No. 3,936,699, as well as in U.S. Pat. No. 3,878,434 to Van Zeeland, the transformer 15 acts to couple the output of the amplifier 14 through the conductors 10, 11 and to transformer 12 to the input of the amplifier such that the amplifier 14 is caused to act as an oscillator producing at its output a signal at a frequency determined by the tuned circuit comprising capacitor 39 and the inductance of windings 16.

The inverter stage circuit, which includes the complementary FETs 64, 65, provides a balanced digital input for amplifier 14 and is thus effective to suppress response of the circuit to transient noise, particularly during the period of turn-on of the power supply when transients are most likely to produce an undesired actuation of the ground fault circuit. To this end, following the turn-on of the power supply, charge is transferred through capacitor 61, resistors 62 and 66, and winding 13 of transformer 12 to one side of capacitor 70, which is coupled to the input of amplifier 14. This charging of capacitor 70 causes the inverter stage 63 consisting of FETs 64, 65 to turn on and also turns on the FETs in the inverter stages 22, 23, and 24 of amplifier 14.

Thus, for the period during which capacitor 70 is being charged in this manner, the drains of FETs 30 and 31, that is, the output of amplifier 14, are unconditionally kept at a low level below that necessary to cause threshold detector 17 to change its level, so that the ground fault circuit cannot respond to a transient or noise signal to actuate SCR 18 during this period, as is desired.

When the FETs 25, 26 and 64, 65 are turned during the charging period of capacitor 70, the drains and gates of these transistors become balanced at an intermediate voltage less than the voltage on power line 56 such that capacitor 70 begins to recharge through resistors 34 and 69 until the voltage across capacitor 70 is balanced or zero, and is maintained at that balanced level as a result of the balanced inputs provided by the CMOS inverter stages 22 and 63 at the two ends of that capacitor.

Upon the balancing of capacitor 70 in this manner, the power voltage is stabilized and the amplifier 14 is able to respond to the presence of a ground fault signal to open the contacts 20, 21 as described above.

It will thus be appreciated that the ground fault circuit of the present invention provides reliable operation in response to a ground fault and also effectively prevents a response to transient signals during the period of turn-on of the power supply. The circuit of the invention requires a significantly lower number of components, as compared to the conventional ground fault interrupter circuit, particularly in the balanced CMOS amplifier-inverter stages, such that this portion of the circuit can be implemented in an integrated circuit at a reduced cost and size.

It is also to be appreciated that although the ground fault interrupter circuit of the invention has been herein specifically disclosed with respect to a single embodiment, modifications may be made therein without necessarily departing from the spirit and scope of the invention.

What is claimed is:

1. A ground fault interrupter circuit comprising means for sensing the occurrence of a ground fault condition in a power line and for producing a ground fault signal upon the sensing of a ground fault condition, means coupled to said sensing means for amplifying said ground fault signal, and switching means operatively connected to said amplifying means and actuated by the application thereto of an amplified ground fault signal, said amplifier means comprising a plurality of series-connected CMOS inverter stages and means operatively connected to said amplifier means for biasing said inverter stages at a transitional phase of operation so as to provide a predetermined gain for said amplifier means.

2. The ground fault interrupter circuit of claim 1, further comprising a threshold detector operatively connected between the output of said amplifier means and said switching means and providing an output signal at one of two levels sufficient to actuate said switching means when the output level of said amplifier means equals or exceeds a predetermined value.

3. The ground fault interrupter circuit of claim 2, in which said threshold detector comprises a second plurality of series-connected CMOS inverter stages.

4. The ground fault interrupter circuit of claim 1, further comprising a feedback resistor connected between the output of the last of said inverter stages and the input of the first of said inverter stages.

5. The ground fault interrupter circuit of claim 1, further comprising charging means coupled to the input of said amplifier means and effective to maintain said amplifier means in a low condition during the period of charge of said charging means, and means coupled to said charging means for providing a balance condition for said charging means during the period of charging thereof.

6. The ground fault interrupter circuit of claim 5, in which said balance providing means comprises an additional CMOS inverter stage having an input coupled to the input of said amplifier means.

7. The ground fault interrupter circuit of claim 6, further comprising a threshold detector operatively coupled between the output of said amplifier means and said switching means and providing an output signal at one of two levels sufficient to actuate said switching means when the output level of said amplifier means equals or exceeds a predetermined value.

8. The ground fault interrupter circuit of claim 7, in which said threshold detector comprises a second plurality of series-connected CMOS inverter stages.

* * * * *